Patented Mar. 2, 1943

2,312,702

UNITED STATES PATENT OFFICE 2,312,702

REACTION PRODUCT OF ALDEHYDES AND TRIAZINE DERIVATIVES

Gaetano F. D'Alelio, Pittsfield, Mass., assignor to General Electric Company, a corporation of New York No Drawing. Application December 24, 1941, Serial No. 424,330

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a triazine derivative corresponding to the following general formula:

I 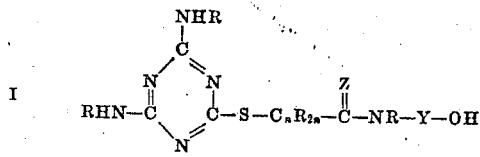

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halo-hydrocarbon radicals. Since $n$ represents an integer which is 1 or 2, it will be seen that the linkage of the hydroxycarbocyclic-carbamyl-alkyl or hydroxycarbocyclic-thiocarbamyl-alkyl grouping to the sulfur atom in all cases will be alpha or beta to the hydroxycarbocyclic-carbamyl or -thiocarbamyl grouping. It also will be observed that linkage of the triazinyl grouping to the sulfur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, etc. Preferably R in Formula I is hydrogen. Also especially suitable for use in carrying the present invention into effect are triazine derivatives corresponding to the general formulas II 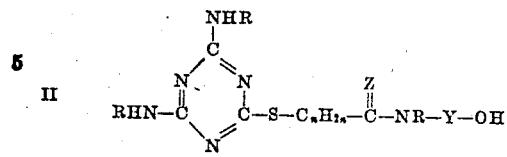

and, more particularly,

III 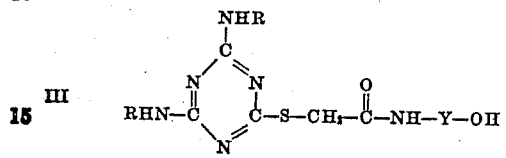

where $n$, Z, Y and R have the same meanings as above given with reference to Formula I.

Illustrative examples of divalent carbocyclic radicals that Y in Formulas I, II and III may represent are: divalent aryl, e. g., phenylene, xenylene, naphthylene, etc.; divalent aliphatic-aryl, e. g., 2,5-tolylene, para-(2,3-xylylene), etc.; divalent cycloaliphatic, e. g., cyclopentylene, cyclohexylene, cyclopentenylene, cyclohexenylene, cycloheptylene, etc.; and their homologues, as well as those divalent carbocyclic radicals with one or more of their hydrogen atoms replaced by a substituent, e. g., halogeno, amino, acetyl, acetoxy, carbalkoxy, alkoxy, aryloxy, sulfamyl, alkyl, alkenyl, a hydroxy group or groups in addition to the single —OH group shown in the above formulas, etc. Specific examples of substituted divalent carbocyclic radicals are chlorophenylene, bromophenylene, chloronaphthylene, bromonaphthylene, bromo 2,5-tolylene, chlorocyclopentylene, chlorocyclopentenylene, carbomethoxyphenylene, ethoxyphenylene, acetophenylene, acetoxyphenylene, bromocyclopentylene, aminophenylene, phenoxyphenylene, sulfamylphenylene, methylphenylene (tolylene), allylphenylene, etc. Preferably Y is phenylene or methylphenylene.

Instead of the symmetrical triazines (s-triazines) represented by the above formulas, corresponding derivatives of the asymmetrical triazines or of the vicinal triazines may be used. Also, instead of the triazinyl monosulfides represented by the above formulas, the di- or trisulfides of the triazines (symmetrical, asymmetrical or vicinal) may be employed.

The triazine derivatives that are used in carrying the present invention into effect are more fully described and claimed in my copending application Serial No. 423,691, filed December 19, 1941, and assigned to the same assignee as the present invention. As pointed out in this copending application, a suitable method of preparing the triazine derivatives employed in practicing the present invention comprises effecting reaction between a mercapto diamino

symmetrical triazine (s-triazine) and a hydroxycarbocyclic - carbamyl - alkyl halide (or a hydroxycarbocyclic-thiocarbamyl-alkyl halide) in the presence of a hydrohalide acceptor, e. g., an alkali-metal hydroxide. When the starting components, proportions thereof and reaction conditions are such that the hydrogen atom of the —OH group of the hydroxycarbocyclic compound is replaced by the residue of the hydrohalide acceptor, e. g., by an alkali metal, the hydroxy compound desired as a final product is obtained by treating this intermediate product with hydrochloric, hydrobromic, sulfuric or other suitable organic or inorganic acid in an amount just sufficient to form the desired hydroxy derivative.

Specific examples of triazinyl hydroxycarbocyclic-carbamyl-alkyl sulfides and triazinyl hydroxycarbocyclic-thiocarbamyl-alkyl sulfides that may be used in producing my new condensation products are listed below:

The diamino s-triazinyl ortho-, meta- and para-hydroxyphenyl-carbamyl-methyl sulfides
The diamino s-triazinyl ortho-, meta- and para-hydroxyphenyl-thiocarbamyl-methyl sulfides
The diamino s-triazinyl ortho-, meta- and para-hydroxytolyl-carbamyl-methyl sulfides
The diamino s-triazinyl ortho-, meta- and para-hydroxytolyl-thiocarbamyl-methyl sulfides
The 4,6-di-(methylamino) s-triazinyl ortho-, meta- and para - hydroxyphenyl - carbamyl-methyl sulfides
The 4,6-di-(ethylamino) s-triazinyl ortho-, meta- and para-hydroxyphenyl-thiocarbamyl-methyl sulfides
The 4,6-di-(anilino) s-triazinyl ortho-, meta- and para-hydroxytolyl-carbamyl-methyl sulfides
The 4,6-di-(cyclohexylamino) s-triazinyl ortho-, meta- and para - hydroxytolyl - thiocarbamyl-methyl sulfides
The diamino s-triazinyl alpha-(ortho-, meta- and para-hydroxyphenyl-carbamyl-ethyl) sulfides
The diamino s-triazinyl beta-(ortho-, meta- and para-hydroxyphenyl-carbamyl-ethyl) sulfides
The diamino s-triazinyl alpha-(ortho-, meta- and para-hydroxyphenyl-thiocarbamyl-ethyl) sulfides
The diamino s-triazinyl beta-(ortho-, meta- and para-hydroxyphenyl-thiocarbamyl-ethyl) sulfides
The diamino s-triazinyl alpha-(ortho-, meta- and para-hydroxytolyl carbamyl-ethyl) sulfides
The diamino s-triazinyl beta-(ortho-, meta- and para-hydroxytolyl carbamyl-ethyl) sulfides
The diamino s-triazinyl alpha-(ortho-, meta- and para-hydroxytolyl thiocarbamyl-ethyl) sulfides
The diamino s-triazinyl beta-(ortho-, meta- and para-hydroxytolyl thiocarbamyl-ethyl) sulfides
The 4,6-di-(methylamino) s-triazinyl-2 alpha-(ortho-, meta- and para-hydroxyphenyl carbamyl-ethyl) sulfides
The 4,6 - di-(propylamino) s-triazinyl-2 beta-(ortho-, meta- and para-hydroxyphenyl carbamyl-ethyl) sulfides
The 4,6-di-(anilino) s-triazinyl-2 alpha-(ortho-, meta- and para-hydroxytolyl-carbamyl-ethyl) sulfides
The 4,6 - di - (cycloheptylamino) s - triazinyl - 2 beta-(ortho-, meta and para-hydroxytolyl-carbamyl-ethyl) sulfides
The 4,6 - di-(ethylamino) s-triazinyl-2 alpha-(ortho-, meta- and para-hydroxyphenyl-thiocarbamyl-ethyl) sulfides
4-ethylamino 6-amino s-triazinyl-2 alpha-(para-hydroxyphenyl-carbamyl-pentyl) sulfide
4-(3'-butenylamino) 6-methylamino s-triazinyl-2 hydroxyphenyl - carbamyl - (phenyl) -methyl sulfide
4 - cyclohexenylamino 6 - naphthylamino s - triazinyl - 2 para - hydroxyphenyl - (chloroethyl) -carbamyl-methyl sulfide
4-chlorocyclopentylamino 6-toluido s-triazinyl-2 hydroxycyclohexyl-(phenyl) - carbamyl-methyl sulfide
4-bromotoluido 6-benzylamino s-triazinyl-2 hydroxycyclopentyl-carbamyl-(tolyl)-methyl sulfide
4,6-di-(iodophenylamino) s-triazinyl-2 hydroxyphenyl-carbamyl-methyl sulfide
4-amino 6-fluorotoluido s-triazinyl-2 hydroxytolyl-carbamyl-methyl sulfide Additional examples of triazine derivatives that may be employed in producing the new condensation products of the present invention are given in my above-identified copending application Serial No. 423,691.

The present invention is based on my discovery that new and valuable materials of particular utility in the plastics and coating arts can be produced by effecting reaction between ingredients comprising essentially an aldehyde, including polymeric aldehydes and aldehyde-addition products, and certain triazinyl hydroxycarbocyclic-carbamyl (or thiocarbamyl)-alkyl sulfides, numerous examples of which have been given above and in the above-identified copending application.

Resins heretofore have been made by condensing an aldehyde with certain thioammeline ethers, but such known resins are not entirely satisfactory from the standpoint of optimum heat- and abrasion-resistance and in curing characteristics. One possible explanation for these deficiencies in desirable properties is the fact that the starting material contains thio groups that are aldehyde-non-reactable. In marked contrast the starting organic sulfides used in practicing this invention contain aldehyde-reactable thio groups attached to the triazine nucleus, thereby imparting to the condensation products of such sulfides with aldehydes increased heat- and abrasion-resistance and improved curing characteristics as compared with resinous condensation products of an aldehyde and the thioammeline ethers heretofore used.

Resins also have been made heretofore by condensing an aldehyde, e. g., formaldehyde, with a hydroxycarbocyclic compound, e. g., a phenol. The well-known phenol-aldehyde synthetic resins are typical examples of such condensation products. Although these resins have a wide field of utility, there are many applications for which they are unsuited, for instance where lightness of color or high arc resistance are desired. The resins of the present invention combine in one product the desirable properties of the phenol-aldehyde condensation products, while at the same time providing a material of more desirable properties, e. g., improved color and higher arc resistance, than the phenol-aldehyde resins.

In carrying my invention into effect the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence of solvents or diluents, fillers, other natural or synthetic resinous bodies, or while admixed with other materials that also can react with the aldehydic reactant or with the triazine derivative, e. g., ketones, urea ($NH_2CONH_2$), thiourea, selenourea, iminourea (guanidine), substituted ureas, thioureas, selenoureas and iminoureas, numerous examples of which are given in various copending applications of mine, for instance in my copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the triazine derivatives constituting the primary components of the resins of the present invention, e. g., melamine, ammeline, ammelide, melem, melam, melon, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like.

The modifying reactants may be incorporated with the triazine derivative and the aldehyde by mixing all the reactants and effecting condensation therebetween or by various permutations of reactants as described, for example, in my copending application Serial No. 363,037 with particular reference to reactions involving a urea, an aldehyde and a semi-amide of oxalic acid. For instance, I may form a partial condensation product of ingredients comprising (1) urea or melamine or urea and melamine, (2) a triazine derivative of the kind herein described (for example, a diamino s-triazinyl ortho-, meta- or para-hydroxyphenyl-carbamyl-methyl sulfide, a diamino s-triazinyl ortho-, meta- or para-hydroxytolyl-carbamyl-methyl sulfide, etc.) and (3) an aldehyde, including polymeric aldehydes and aldehyde-addition products, for instance formaldehyde, paraformaldehyde, dimethylol urea, a polymethylol melamine, e. g., hexamethylol melamine, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have a high dielectric strength and excellent resistance to arcing. They have a good surface finish and, in general, are better than the ordinary urea-formaldehyde resins in resistance to water.

Depending upon the particular conditions of reaction and the particular reactants employed, the intermediate or partial condensation products vary from clear, colorless or colored, syrupy, water-soluble liquids to viscous, milky dispersions and gel-like masses of decreased solubility in ordinary solvents, e. g., alcohol, dioxane, Cellosolve, ethylene glycol, glycerine, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

Example 1

| | Parts |
|---|---|
| Diamino s-triazinyl para-hydroxyphenyl-carbamyl-methyl sulfide (4,6-diamino s-triazinyl-2 para-hydroxyphenyl-carbamyl-methyl sulfide; 2,6-diamino s-triazinyl-4 para-hydroxyphenyl-carbamyl-methyl sulfide; 2,4-diamino s-triazinyl-6 para-hydroxyphenyl-carbamyl-methyl sulfide) | 29.2 |
| Aqueous formaldehyde (approx. 37.1% HCHO) | 48.6 |
| Aqueous ammonia (approx. 28% $NH_3$) | 1.5 |
| Aqueous solution of sodium hydroxide (0.5 N) | 1.0 |
| Water | 40.0 |
| Chloroacetamide (monochloroacetamide) | 0.3 |

All of the above components with the exception of chloroacetamide were heated together under reflux at the boiling temperature of the mass for 8 minutes. At the end of this time two layers had formed. The chloroacetamide was now added and refluxing was continued for an additional 3 minutes to cause the chloroacetamide to intercondense with the partial condensation product of the triazine derivative and formaldehyde. The resulting syrup was mixed with 27 parts alpha cellulose in flock form and 0.1 part of a mold lubricant, specifically zinc stearate, to form a molding (moldable) compound. The wet molding composition was dried at room temperature until sufficient moisture had been removed to yield a compound that could be molded satisfactorily. A sample of the dried and finely ground molding compound was molded (into the form of a disk) for 5 minutes at 140° C. under a pressure of 5,600 pounds per square inch. The molded piece was extracted hot from the mold and, upon cooling to room temperature, did not become distorted. It was well cured throughout and had a well-knit and homogeneous structure. The molding compound showed good plastic flow during molding. The molded disk was tested for its water-resistance characteristics by immersing it in boiling water for 15 minutes, followed by immersion in cold water for 5 minutes. It absorbed only 4.9% by weight of water on this accelerated test.

Example 2

Example 1 was repeated using diamino s-triazinyl ortho-hydroxyphenyl-carbamyl-methyl sulfide in place of the corresponding para compound. The molding composition of this example was molded into the form of a disk, using a molding time of 5 minutes, a temperature of 140° C. and a pressure of 6,750 pounds per square inch. The molded product was white in color, as compared with the yellowish, brownish or reddish pieces obtained when similar compositions are prepared utilizing the ordinary phenol-formaldehyde resins. The molded piece was well cured throughout. It absorbed only 3.46% by weight of water when tested for its water resistance as described under Example 1.

Instead of using chloroacetamide in accelerating the curing of the potentially reactive resinous material (Examples 1 and 2 and subsequent examples), heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha beta dibromopropionitrile, aminoacetamide hydrochloride, ethylene diamine monohydrochloride, the ethanolamine hydrochlorides, nitrourea, chloroacetyl urea, chloroacetone, glycine, sulfamic acid, citric diamide, phenacyl chloride, etc.). Other examples of active and latent curing catalysts and of curing reactants that may be employed to accelerate or to effect the curing of the thermosetting or potentially thermosetting resins of these and other examples are given in various copending applications of mine, for instance in copending applications Serial No. 346,962, filed July 23, 1940, and Serial No. 354,395, filed August 27, 1940, both of which applications are assigned to the same assignee as the present invention.

Example 3

| | Parts |
|---|---|
| Diamino s-triazinyl ortho-hydroxyphenyl-carbamyl-methyl sulfide | 14.6 |
| Urea | 30.0 |
| Aqueous formaldehyde (approx. 37.1% HCHO) | 89.1 |
| Aqueous solution of sodium hydroxide 0.5 N) | 2.0 |
| Aqueous ammonia (approx. 28% $NH_3$) | 3.5 |
| Chloroacetamide | 0.4 |

All of the above components with the exception of the chloroacetamide were heated together under reflux at the boiling temperature of the mass for 15 minutes. The chloroacetamide was now added and refluxing was continued for an additional 5 minutes. The resulting partial condensation product was mixed with 49.5 parts alpha cellulose in flock form and 0.3 part zinc stearate to form a molding compound. The wet compound was dried for about 16 hours at room temperature. A sample of the dried and finely ground compound was molded (into the form of a disk) for 5 minutes at 140° C. under a pressure of 5,600 pounds per square inch. The disk was extracted hot from the mold. It did not become distorted upon cooling to room temperature. The molded piece was well cured and had a well-knit and homogeneous structure. The molding compound showed good flow characteristics during molding, as evidenced by the flash on the molded piece. The molded disk also showed good water resistance.

Example 4

| | Parts |
|---|---|
| Diamino s-triazinyl para-hydroxyphenyl-carbamyl-methyl sulfide | 14.6 |
| Melamine | 37.8 |
| Aqueous formaldehyde approx. 37.1% HCHO) | 97.2 |
| Aqueous solution of sodium hydroxide (0.5 N) | 2.5 |
| Aqueous ammonia (approx. 28% $NH_3$) | 2.0 |
| Chloroacetamide | 0.3 |

All of the above ingredients with the exception of the chloroacetamide were heated together under reflux at the boiling temperature of the mass for 10 minutes. The chloroacetamide was now added and refluxing was continued for an additional 1 minute. A molding compound was made from the resulting resinous syrup by mixing therewith 51.5 parts alpha cellulose and 0.3 part zinc stearate. The wet compound was dried at room temperature as described under Example 1. A sample of the dried and finely ground molding compound was molded into the form of a disk at 140° C., using a molding time of 5 minutes and a pressure of 9,000 pounds per square inch. The molding compound showed good plastic flow during molding. The molded disk was well cured, well knit and homogeneous throughout. It had excellent water resistance.

*Example 5*

| | Parts |
|---|---|
| Diamino s-triazinyl ortho-hydroxyphenyl-carbamyl-methyl sulfide | 29.2 |
| Sulfanilamide | 17.2 |
| Aqueous formaldehyde (approx. 37.1% HCHO) | 48.6 |
| Aqueous solution of sodium hydroxide (0.5 N) | 2.0 |
| Water | 20.0 |
| Chloroacetamide | 0.4 |

All of the above components with the exception of the chloroacetamide were heated together under reflux at boiling temperature for 4 minutes. (At the end of this time the mass had separated into two layers.) The chloroacetamide was now added and refluxing was continued for an additional 2 minutes. The resulting resinous syrup was mixed with 32.5 parts alpha cellulose and 0.2 part zinc stearate to form a molding compound. The wet composition was dried at room temperature for about 16 hours. A sample of the dried and ground molding compound was molded for 5 minutes at 140° C. under a pressure of 2,000 pounds per square inch. A well-cured molded piece that was well knitted together into a homogeneous structure was obtained. The molded piece had very good water resistance, as shown by the fact that it absorbed only 1.98% by weight of water when tested as described under Example 1. The molded article also had ample flash when it was removed from the mold, indicating that the plastic flow during molding was satisfactory.

*Example 6*

| | Parts |
|---|---|
| Diamino s-triazinyl para-hydroxyphenyl-carbamyl-methyl sulfide | 14.6 |
| Dimethylol urea (commercial grade containing approx. 11% by weight of water) | 60.6 |
| Water | 80.0 |
| Aqueous solution of sodium hydroxide (0.5 N) | 2.0 |
| Aqueous ammonia (approx. 28% NH3) | 3.0 |
| Chloroacetamide | 0.4 |

All of the above components with the exception of the chloroacetamide were heated together under reflux at boiling temperature for 23 minutes. The chloroacetamide was now added and refluxing was continued for an additional 5 minutes. A molding composition was made from the resulting resinous syrup by mixing therewith 53.5 parts alpha cellulose in flock form and 0.3 part zinc stearate. The wet molding compound was dried at room temperature for about 16 hours. A molded disk was produced by molding a sample of the dried and finely ground molding composition for 5 minutes at 140° C. under a pressure of 4,500 pounds per square inch. The molded disk was well cured throughout, as shown by the fact that it absorbed only 3.64% by weight of water when tested for its water resistance as described under Example 1. The piece was extracted hot from the mold and did not become distorted upon cooling to room temperature. Its plastic flow during molding was very good.

*Example 7*

| | Parts |
|---|---|
| Diamino s-triazinyl ortho-hydroxyphenyl carbamyl-methyl sulfide | 14.6 |
| Trimethylol melamine (crystalline) | 42.3 |
| Water | 80.0 |
| Aqueous solution of sodium hydroxide (0.5 N) | 2.5 |
| Aqueous ammonia (approx. 28% NH3) | 2.0 |
| Chloroacetamide | 0.3 |

After heating together all of the above components with the exception of the chloroacetamide under reflux at boiling temperature for 7 minutes, the chloroacetamide was added and the resulting syrup immediately was mixed with 31.1 parts alpha cellulose and 0.2 part zinc stearate. The wet molding compound thereby obtained was dried at room temperature for about 16 hours. A well-cured, well-knit molded disk having a homogeneous structure was produced by molding a sample of the dried and finely ground compound for 5 minutes at 140° C. under a pressure of 5,600 pounds per square inch. The molded piece had exceptionally high water resistance, as shown by the fact that it absorbed only 0.23% by weight of water when tested as described under Example 1. The molding compound showed good plastic flow during molding.

*Example 8*

| | Parts |
|---|---|
| Diamino s-triazinyl ortho-hydroxyphenyl-carbamyl-methyl sulfide | 87.6 |
| Furfural | 196.0 |
| Aqueous solution of sodium hydroxide (0.5 N) | 3.0 | were heated together under reflux at the boiling temperature of the mass for 7 minutes. The resulting syrup hardened when a small sample was heated on a 140° C. hot plate. The addition of glycine, phthalic monoamide, aminoacetamide hydrochloride, phenacyl chloride and other curing agents such as mentioned hereinbefore accelerated the conversion of the resin to an insoluble and infusible state when the individual samples containing the curing agent were heated on a 140° C. hot plate. The cured resin possessed excellent adhesive and cohesive characteristics. The resinous composition of this example is especially suitable for the production of molding compounds.

*Example 9*

Example 8 was repeated using diamino s-triazinyl para-hydyroxyphenyl-carbamyl-methyl sulfide instead of the corresponding ortho compound. The resulting resin had properties much the same as the product of Example 8 with the exception that the cured resin was less adhesive than the cured resin of Example 8.

*Example 10*

| | Parts |
|---|---|
| Diamino s-triazinyl ortho-hydroxyphenyl carbamyl-methyl sulfide | 43.8 |
| Acrolein | 56.0 |
| Water | 100.0 |
| Aqueous solution of sodium hydroxide (0.5 N) | 2.0 | were mixed (the acrolein being added last) and heated together under reflux at boiling temperature for 20 minutes. When a sample of the resulting resin was heated on a 140° C. hot plate, it hardened in about 2½ minutes. When glycine, phenacyl chloride, phthalic monoamide, aminoacetamide hydrochloride, chloroacetamide and other curing agents such as mentioned hereinbefore were added to the resin, the modified resin set to an infusible mass in less than 2½ minutes when the individual sample was heated on a 140° C. hot plate. The cured resin showed excellent cohesive characteristics. The product of this example may be used in the production of laminating varnishes and molding compositions.

Example 11

| | Parts |
|---|---|
| Diamino s-triazinyl para-hydroxyphenyl-carbamyl-methyl sulfide | 43.6 |
| Butyl alcohol | 74.0 |
| Aqueous formaldehyde (approx. 37.1% HCHO) | 81.0 |
| Aqueous solution of sodium hydroxide (0.5 N) | 3.0 | were heated together under reflux at boiling temperature for 15 minutes, yielding a clear syrup. This syrup was dehydrated. The dehydrated, syrupy resin was soluble in ethyl alcohol, ethylene glycol, Cellosolve, benzyl alcohol, butyl alcohol and dioxane. When a sample of the dehydrated syrup containing a curing agent, specifically hydrochloric acid, was applied to a glass plate and the coated plate was baked for about 16 hours at 80° C., a hard, transparent, water-white, water-resistant, smooth, adhering film was formed on the plate. When the curing agent was omitted, the film was slightly softer and less resistant to water. The resinous composition of this example is especially suitable for use in the production of lacquers, enamels, varnishes and other surface-protective coating compositions.

Example 12

| | Parts |
|---|---|
| Diamino s-triazinyl ortho-hydroxyphenyl-carbamyl-methyl sulfide | 43.6 |
| Acetamide | 8.9 |
| Aqueous formaldehyde (approx. 37.1% HCHO) | 121.0 |
| Aqueous solution of sodium hydroxide (0.5 N) | 2.5 | were heated together under reflux at the boiling temperature of the mass for 13 minutes, yielding a clear resinous syrup. When a sample of this syrup was heated on a 140° C. hot plate, it set to a rubbery, uncured mass in less than 2 minutes. However, the addition of glycine, aminoacetamide hydrochloride, chloroacetamide and other curing agents such as hereinbefore mentioned, followed by heating on a 140° C. hot plate, caused the resin to cure rapidly to an infusible state. The resinous compositions to which curing agents had been added therefore would be suitable for use in the manufacture of laminating varnishes and molding compounds. The resin initially obtained, that is, prior to the addition of the curing agent, may be used as a modifier of other synthetic resins. For example, it may be used as a modifier of rapidly curing aminoplasts to control their flow or plasticity characteristics.

Example 13

| | Parts |
|---|---|
| Diamino s-triazinyl ortho-hydroxyphenyl-carbamyl-methyl sulfide | 43.6 |
| Diethyl malonate | 24.0 |
| Aqueous formaldehyde (approx. 37.1% HCHO) | 121.0 |
| Aqueous solution of sodium hydroxide (0.5 N) | 3.0 | were heated together under reflux at the boiling temperature of the mass for 30 minutes. When a sample of the resulting syrupy condensation product was heated on a 140° C. hot plate, a soft thermoplastic resin was obtained. The thermoplasticity of the resin appeared to be unchanged by the addition of curing agents such as hereinbefore mentioned. The dehydrated syrupy resin was soluble in ethyl alcohol, dioxane, butyl alcohol, ethylene glycol, etc. The resinous material of this example is especially suitable for use as a plasticizer in molding compounds and coating compositions where products of improved flow characteristics are desired.

Example 14

| | Parts |
|---|---|
| Diamino s-triazinyl para-hydroxyphenyl-carbamyl-methyl sulfide | 43.6 |
| Glycerine | 13.8 |
| Aqueous formaldehyde (approx. 37.1% HCHO) | 121.0 |
| Aqueous sodium hydroxide solution (0.5 N) | 3.0 | were heated together under reflux at the boiling temperature of the mass for 17 minutes. The resinified syrup was dehydrated. The dehydrated syrup was soluble in ethyl alcohol, Cellosolve, butyl alcohol, dioxane, ethylene glycol and other solvents. Samples of the soluble resin, with and without a curing agent, were applied to glass plates and the coated plates were baked in an oven at 80° C. for several hours. In all cases the baked films were exceptionally hard, water-clear, smooth, glossy, very resistant to water and tightly adhering to the glass surface. The solubility and film-forming characteristics of the resinous material of this example make it especially suitable for use in the production of spirit and baking varnishes and other liquid coating compositions. It may be used as a modifier of varnishes of the aminoplast and alkyd-resin types.

Example 15

| | Parts |
|---|---|
| Diamino s-triazinyl ortho-hydroxyphenyl-carbamyl-methyl sulfide | 43.6 |
| Polyvinyl alcohol | 6.6 |
| Aqueous formaldehyde (approx. 37.1% HCHO) | 121.0 |
| Water | 110.0 |
| Aqueous solution of sodium hydroxide (0.5 N) | 3.0 | were heated together under reflux at the boiling temperature of the mass for 4½ minutes, at the the end of which time the solution began to cloud. A sample of the partial condensation product was heated on a 120° C. hot plate. After heating for a short time at this temperature, the material became very syrupy and sticky. Immediately after this stage it could be drawn into fibers. The resinous material could be drawn into continuous filaments three to four feet long without breaking. No effort was made to obtain longer filaments by controlling the drawing conditions.

When a glass plate was coated with a sample of the resin and the coated plate was baked at 80° C. for several hours, a very hard, smooth, adhering, water-resistant film was formed on the plate. In the absence of a curing agent, the film was transparent; but when a curing agent, e. g., hydrochloric acid, was present the film was translucent.

The resinous material of this example, with no added curing agent present, is suitable for use in the production of fiber-forming compositions and coating materials. When curing agents such as hereinbefore have been mentioned are incorporated into the syrupy or dehydrated resin, the resulting product may be used in the preparation of molding compounds, various coating compositions such as varnishes, lacquers, enamels, etc., and for numerous other purposes.

It will be understood, of course, by those skilled in the art that the reaction between the aldehyde and the triazine derivative may be effected at temperatures ranging, for example, from room temperature to the fusion or boiling temperatures of the mixed reactants or of solutions of the mixed reactants, the reaction proceeding more slowly at normal temperatures than at elevated temperatures in accordance with the general laws of chemical reactions. Thus, instead of effecting reaction between the ingredients of the above examples at boiling temperature under reflux as mentioned in the various examples, the reaction between the components may be carried out at temperatures ranging from room temperature to the boiling temperature using longer reaction periods and, in some cases, stronger catalysts and higher catalyst concentrations.

It also will be understood by those skilled in the art that my invention is not limited to condensation products obtained by reaction of ingredients comprising an aldehyde and the specific diamino s-triazinyl hydroxycarbocyclic-carbamyl-alkyl sulfides named in the above illustrative examples. Thus, instead of diamino s-triazinyl ortho-hydroxyphenyl-carbamyl-methyl sulfide and diamino s-triazinyl para-hydroxyphenyl-carbamyl-methyl sulfide mentioned in the above examples, I may use diamino s-triazinyl meta-hydroxyphenyl-carbamyl-methyl-sulfide, the diamino s-triazinyl hydroxytolyl-carbamyl-methyl sulfides, or any other organic sulfide (or mixture thereof) of the kind with which this invention is concerned, numerous examples of which compounds have been given hereinbefore and in my copending application Serial No. 423,691.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, crotonaldehyde, benzaldehyde, furfural, hydroxyaldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, substituted ureas, selenoureas, thioureas and iminoureas (numerous examples of which are given in my copending application Serial No. 377,524), mono- and poly-(N-carbinol) derivatives of amides of poly-carboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminodiazines, etc. Particularly good results are obtained with active methylene-containing bodies such as a methylol urea, more particularly mono- and di-methylol ureas, and a methylol melamine, e. g., monomethylol melamine and polymethylol melamine (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexa-methylol melamine, etc.

The ratio of the aldehydic reactant to the triazine derivative may be varied over a wide range depending upon the particular properties desired in the final product. Ordinarily these reactants are employed in an amount corresponding to at least one mol of the aldehyde, specifically formaldehyde, for each mol of the triazine derivative. Thus, I may use, for example, from 1 to 8 or 9 mols of an aldehyde for each mol of triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance, from 2 or 3 up to 15 or 20 mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acryloamide, benzamide, toluene sulfonamides, benzene sulfonamides, adipic diamide, phthalamide, etc.; amines such as ethylene diamine, phenylene diamine, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in my copending applications Serial No. 289,273, filed August 9, 1939, now Patent No. 2,281,559, issued May 5, 1942, and Serial No. 400,649, filed July 1, 1941; and others.

The modifying bodies also may take the form of high molecular weight bodies with or without resinous characteristics, for example, hydrolyzed wood products, formalized cellulose derivatives, lignin, protein-aldehyde condensation products, condensation products of an aldehyde-reactable diazine with an aldehyde, aminothiazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Dyes, pigments, plasticizers, mold lubricants, opacifiers, curing agents and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and a compound corresponding to the general formula

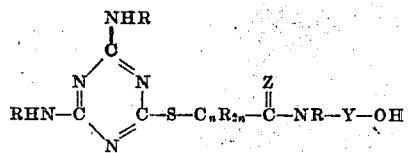

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

2. A composition as in claim 1 wherein the aldehyde is formaldehyde.

3. A composition as in claim 1 wherein the reaction product is an alkaline-catalyzed reaction product of the stated components.

4. A composition of matter comprising the reaction product of ingredients comprising an aldehyde and a compound corresponding to the general formula

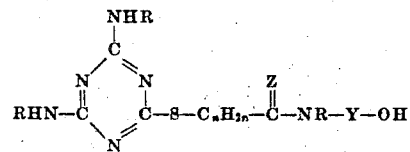

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

5. A heat-curable resinous composition comprising a heat-convertible condensation product of ingredients comprising formaldehyde and a compound corresponding to the general formula

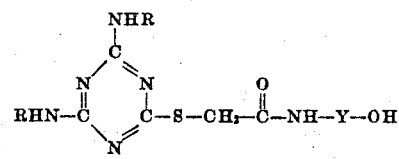

where Y represents a divalent carbocyclic radical and R represents a member of the class consisting of hydrogen and monovalent hydrocarbon and halo-hydrocarbon radicals.

6. A product comprising the heat-cured resinous composition of claim 5.

7. A resinous composition comprising the product of reaction of ingredients comprising an aldehyde and a diamino s-triazinyl hydroxycarbocyclic-carbamyl-methyl sulfide.

8. A resinous composition comprising the product of reaction of ingredients comprising formaldehyde and a diamino s-triazinyl hydroxyphenyl-carbamyl-methyl sulfide.

9. A resinous composition comprising the product of reaction of ingredients comprising an aldehyde and a diamino s-triazinyl hydroxytolyl-carbamyl-methyl sulfide.

10. A composition comprising the product of reaction of ingredients comprising a urea, an aldehyde and a compound corresponding to the general formula

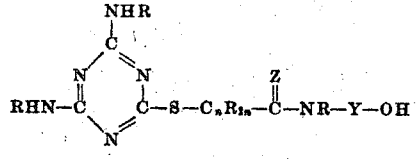

where $n$ represents an integer and is at least 1 and not more than 2, Z represents a member of the class consisting or oxygen and sulfur, Y represents a divalent carbocyclic radical, and R represents a member of the class consisting of hydrogen and monovalent hydrocarbon and halo-hydrocarbon radicals.

11. A composition as in claim 10 wherein the urea component is the compound corresponding to the formula $NH_2CONH_2$ and the aldehyde is formaldehyde.

12. A heat-curable composition comprising the heat-convertible resinous reaction product of (1) a partial condensation product of ingredients comprising formaldehyde and a diamino s-triazinyl hydroxycarbocyclic-carbamyl-methyl sulfide, and (2) a curing reactant.

13. A resinous composition as in claim 12 wherein the curing reactant is a chlorinated acetamide.

14. A product comprising the heat-cured composition of claim 12.

15. A composition comprising the product of reaction of ingredients comprising urea, formaldehyde and a diamino s-triazinyl hydroxyphenyl-carbamyl-methyl sulfide.

16. A composition comprising the product of reaction of ingredients comprising a methylol urea and a diamino s-triazinyl hydroxyphenyl-carbamyl-methyl sulfide.

17. A composition comprising the product of reaction of ingredients comprising a polymethylol melamine and a diamino s-triazinyl hydroxyphenyl-carbamyl-methyl sulfide.

18. A composition comprising the product of reaction of ingredients comprising melamine, formaldehyde and a diamino s-triazinyl hydroxyphenyl-carbamyl-methyl sulfide.

19. A resinous composition comprising the product of reaction of (1) a partial condensation product of ingredients comprising urea, formaldehde and diamino s-triazinyl para-hydroxyphenyl-carbamyl-methyl sulfide, and (2) a chlorinated acetamide.

20. The method of preparing new condensation products which comprises effecting reaction between ingredients comprising an aldehyde and a compound corresponding to the general formula

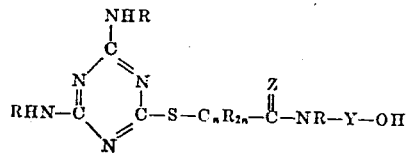

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals.

GAETANO F. D'ALELIO.

CERTIFICATE OF CORRECTION.

Patent No. 2,312,702.    March 2, 1943.

GAETANO F. D'ALELIO.

It is hereby certified that error appears in the printed specification of the above numbered patent requiring correction as follows: Page 2, first column, line 70, for "beta" read -- beta- --; page 4, first column, line 22, before "chloroacetamide" insert --the--; and second column, line 62, for "approx." read --(approx.--; page 5, first column, line 51, for "60.6" read --60.0--; and second column, line 70, for "ortho-hydroxyphenyl" read -- ortho-hydroxyphenyl- --; page 6, second column, line 66, strike out "the" second occurrence; page 7, first column, line 49, for "aboxe" read --above--; page 8, first column, line 1, for "aminothiazole" read --aminotriazole--; and second column, line 58, claim 10, for "or oxygen" read --of oxygen--; and that the said Letters Patent should be read with this correction therein that the same may conform to the record of the case in the Patent Office.

Signed and sealed this 1st day of June, A. D. 1943.

Henry Van Arsdale,
Acting Commissioner of Patents.

(Seal)